United States Patent [19]

Dahl

[11] 4,239,884
[45] Dec. 16, 1980

[54] PROCESS FOR ISOLATION OF SOLID POLYMERS

[75] Inventor: Klaus J. Dahl, Atherton, Calif.

[73] Assignee: Raychem Corporation, Menlo Park, Calif.

[21] Appl. No.: 603,635

[22] Filed: Aug. 11, 1975

[51] Int. Cl.³ .............................................. C08G 33/10
[52] U.S. Cl. .................................... 528/486; 528/488; 528/175; 528/490; 528/492; 528/495; 528/496; 528/499; 528/125
[58] Field of Search ............... 260/63, 47 R; 528/488, 528/490, 492, 495, 496, 499, 125, 175

[56] References Cited

U.S. PATENT DOCUMENTS

| 3,065,205 | 11/1962 | Bouner | 260/63 |
| 3,441,538 | 4/1969 | Marks | 260/2 R |
| 3,442,857 | 5/1969 | Thornton | 260/47 |
| 3,516,966 | 6/1970 | Berr | 260/47 |
| 3,637,592 | 1/1972 | Berr | 260/61 |
| 3,668,057 | 6/1972 | Agolini et al. | 260/63 |
| 3,751,398 | 8/1973 | Dahl | 260/47 R |
| 3,791,890 | 2/1974 | Gander et al. | 260/61 |

FOREIGN PATENT DOCUMENTS

| 971227 | 9/1964 | United Kingdom . |
| 1078234 | 8/1967 | United Kingdom . |
| 1086021 | 10/1967 | United Kingdom . |
| 1153527 | 5/1969 | United Kingdom . |

*Primary Examiner*—V. P. Hoke
*Attorney, Agent, or Firm*—Lyon & Lyon

[57] ABSTRACT

In a Friedel-Crafts catalyzed polymerization reaction, said reaction being selected from the group consisting of

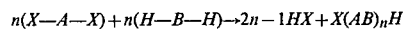

wherein A is

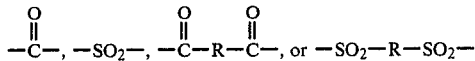

and wherein X is halogen, hydroxy, or alkoxy, and wherein R is alkylene, aryl substituted alkylene, arylene or substituted arylene, or polynuclear aromatic either fused ring or joined by one or more bridging groups such as oxygen, sulfur or a moiety of the structure

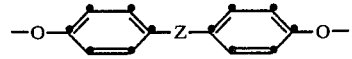

wherein Z is propylidene, CO, SO$_2$, or a chemical bond and wherein B is arylene or substructured arylene, or polynuclear aromatic either fused ring or joined by one or more bridging groups such as CO, oxygen, sulfur or a moiety of the structure

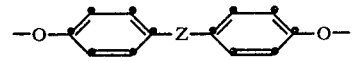

wherein Z is as defined above, and wherein n is the degree of polymerization and is at least about 5 and

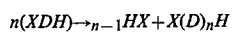

wherein X is as defined above and wherein D is CO—B— or —SO$_2$—B— wherein B is as defined above wherein said polymerization results in the formation of a complex between said Friedel-Crafts catalyst and polymer produced by said reaction and wherein said polymerization reaction is carried out in a solvent, said solvent being present in an amount at least sufficient to dissolve the monomeric species present at the start of said polymerization, the improvement comprising treating said reaction mixture comprising polymer-catalyst complex and solvent with a base having a pK$_a$ of at least about 4.5 as measured in water in an amount at least equimolar to the catalyst present, said base being at least partially soluble in said reaction solvent, being stable in said polymerization reaction medium and not forming a stable adduct with said polymer products to thereby decompose said polymer-catalyst complex and form a base-catalyst complex.

12 Claims, No Drawings

PROCESS FOR ISOLATION OF SOLID POLYMERS

BACKGROUND OF THE INVENTION

In the continuing search for polymers suitable for use at elevated temperatures, many different repeating structures involving diverse connecting linkages have been suggested, e.g., aromatic structures connected by linkages such as imides, ethers, sulfones, ketones, etc. Unfortunately, as performance at elevated temperature has been enhanced, the amenability of the candidate polymers to classical molten techniques of polymer fabrication has declined. Generally, a decline in melt processability also accompanies attempts to produce high temperature resistant polymers having a room temperature elongation of at least about 50%, a necessary property for many polymer applications, e.g., if a wire insulated with the polymer is to be capable of being twisted about itself without cracking of the insulation.

Aromatic polyketones are known to enjoy good resistance to thermal degradation. Bonner, in U.S. Pat. No. 3,065,205, suggests the Friedel-Crafts catalyzed polymerization of certain reactants to yield polyketones. The reactants proposed fall into two classes, aromatic diethers and polynuclear aromatic hydrocarbons, either of which are reacted with aliphatic or aromatic diacyl chlorides. The basic reactions taught by the Bonner patent can be summarized as follows:

(1)
n(HR—O—RH)+n(-Cl—A—Cl)→(2n−1)HCl+H(R—O—R—A)$_n$Cl and (2)
n(HBH)+n(Cl—A—Cl)→(2n−1)HCl+Cl(A—B)$_n$H where HBH is a polynuclear aromatic hydrocarbon such as naphthalene, HR—O—RH is an aromatic ether such as diphenyl ether, and Cl—A—Cl is an aromatic or aliphatic chloride such as terephthaloyl chloride or phosgene. When phosgene and diphenyl ether are reacted, for example, the resulting polymer will contain the repeating unit

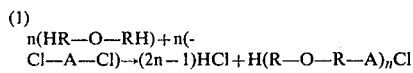
I

An entirely different approach to aromatic polyketones is taken by Farnham and Johnson in British Pat. No. 1,078,234. Here, polyarylene polyethers are produced by reaction of an alkali metal double salt of a dihydric phenol with a dihalo benzenoid compound. The dihydric phenol may contain a keto group—thus, 4,4′-dihydroxy benzophenone is claimed to be polymerizable with 4,4′-dichlorobenzophenone to afford a polyketone of the structure

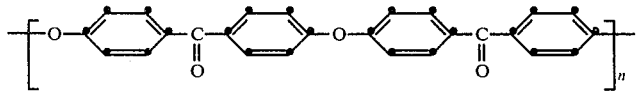

The same polymer repeating unit is disclosed in British Pat. No. 971,227 to arise from the reaction of diphenyl ether with phosgene, from the polycondensation of diphenyl ether-4-carbonyl chloride, and from the reaction of diphenyl ether with diphenyl ether-4,4′-dicarbonyl chloride.

A number of patents dealing with improved methods of making polyketones have issued. Thus, for example, processes disclosed in U.S. Pat. Nos. 3,441,538 and 3,442,857 derive advantage by resort to hydrogen fluoride-enhanced boron trifluoride catalysis, a catalyst system described in *Boron Fluoride and Its Compounds as Catalysts, etc.* by Topchiev et al., Pergamon Press (1959), p. 122; *J. Org. Chem.* 26 2401 (1961); and I&E Chem. 43,746 (1951). A further patent dealing with an improved polymerization process is British Pat. No. 1,086,021.

Example 10 of British Pat. No. 971,227 describes a process for preparing the polymer of repeating unit

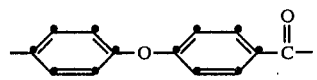

The reported product showed no signs of flowing on heating up to 350° C. and apparently required spinning from solution for fiber formation. The product is also variously described, in Example 1 of U.S. Pat. No. 3,441,538, as yielding polymer of low elongation which afforded opaque brown films, while in British Pat. No. 1,153,527, this polymer is characterized as highly crystalline and intractable from the stand-point of conventional melt fabrication.

The teaching of the foregoing references are incorporated herein by reference to illuminate the background of this invention. It is thus apparent that previous attempts to synthesize polymer I have afforded material of at best questionable purity and/or structural uniformity, e.g., freedom from branching. The prior art, e.g., U.S. Pat. Nos. 3,674,627; 3,637,592, the disclosures of which are incorporated herein by reference, also teach the preparation of other aromatic polysulfones and/or polyketones.

In all instances, isolation and purification of these aforementioned polymers has always presented great difficulties both because of their inherently relatively intractable nature, especially when crystalline, and the intractable nature of most of the preferred polymerization media (e.g., hydrofluoric acid/boron trifluoride). I have, in contradistinction, found that readily melt processable polymers of the above types can be formed if certain synthesis and work-up procedures, as hereinafter described, are utilized. The hereinafter described work-up procedures are also applicable to the synthesis of numerous other polymers. In particular, I have found that aromatic polyketones and aromatic polysulfones produced by Friedel-Crafts catalysed polymerization, as hereinafter described in greater detail, are of substantially enhanced melt processability and thermal and oxidative stability in comparison with analogous polymers produced using prior art Friedel-Crafts polymerization methods.

In U.S. Pat. No. 3,441,538, mentioned hereinabove, it is suggested that polymer I be precipitated by pouring the above-mentioned reaction mixture into methanol, then dissolved in dichlorotetrafluoroacetone hydrate, the solution filtered and the polymer reprecipitated by pouring the solution into methanol. Another isolation technique suggested in the same patent include extracting the polymer, initially precipitated as above, exhaustively with boiling methanol, followed by acetone and dioxane. A similar technique to this last described is also disclosed in U.S. Pat. No. 3,442,857: in one example the crude polymer (precipitated by pouring the reaction mixture into methanol) is leached with boiling pyridine or aqueous ammonia solution. These above techniques are also disclosed in Berr, U.S. Pat. No. 3,516,966.

U.S. Pat. No. 3,668,057 to Angelo discloses the preparation and purification of larger amounts of aromatic polyketone to be used in the extrusion of film. The polymerization reaction mixture (hydrogen fluoride/boron trifluoride) is poured into aqueous ammonia to precipitate the polymer and the precipitated polymer washed with N,N'-dimethylacetamide, then four times with water, thrice with methanol, and dried under vacuum at 50° C. for 2 days. The polyketone was then redissolved in dichloroacetic acid and four very small aliquots of triethylsilane reducing agent were added. The solution was left to stand for several hours, then one last aliquot of triethyl-silane added, the solution poured into a mixture of distilled water and the precipitated polymer washed again successively with N,N'-dimethylacetamide, water and methanol as before. As is apparent, as incredibly complex purification procedure was deemed essential to provide a product of acceptable quality.

Gander et al, in U.S. Pat. No. 3,791,890 refers to the difficulties caused by the "relatively intractable nature of the initial polymer catalyst complex upon formation" (using an $HF/BF_3$ catalyst reaction media) and discloses a method for spraying the reaction mixture into a dispersing medium (liquid or gaseous) such as air, preferably at a temperature between 70° and 120° C., to facilitate preparation of a polyketone such as I in a granular form.

Also, in my U.S. Pat. No. 3,953,400, and in my U.S. Pat. No. 3,751,398, I disclose that dilution of the polyketone polymerization mixture with from 10 to 90% liquid sulfur dioxide (based on the hydrogen fluoride) reduces the stability of the boron trifluoride hydrogen fluoride ketone complex (possibly by reducing the polarity of the solution) and facilitates removal of solvent and catalyst during spray-drying. However, this process suffers from certain disadvantages For example, because it depends on dilution for its effect, substantially complete removal of catalyst only occurs at high dilutions. Thus, the solids content of the mixture to be sprayed must be very low, most preferably below 1 percent. The viscosity of the polymer solution in sulfur dioxide/hydrogen fluoride mixtures is much higher than in hydrogen fluoride alone, and this presents an upper limit to the solids content for solutions to be sprayed which is also undesirably low. Thus, a need has existed for a method of effecting isolation of polyketones and polysulfones which produces the polymer in a clean and melt-stable form and does not suffer from any of the disadvantages of heretofore known processes as set forth above.

It is an object of this invention to provide aromatic polyether ketones and polyether sulfones which are substantially uncontaminated by catalyst residues, especially in the form of complexes with the polymer, or other contaminants.

It is another object of this invention to overcome the relatively intractable nature of the initial polymer catalyst complex thereby rendering these polymers amenable to separation from the reaction mixture.

It is another object of the invention to provide facile, inexpensive and reliable isolation techniques for working up aromatic polyketone and polysulfone polymerization mixtures.

All these and other objects and advantages of the instant invention will be further discussed or made apparent in conjunction with the detailed description thereof and of the embodiments and examples thereof set forth hereinafter.

BRIEF SUMMARY OF THE INVENTION

According to this invention, the recovery from polymerization media of solid aromatic polyketones and aromatic polysulfones produced by Friedel-Crafts catalyzed condensation polymerization is facilitated by the addition to the polymerization media, after the polymerization has proceeded to the desired degree, of an agent more basic than ketone or sulfone groups of the polymer in an amount at least the molar equivalent of the catalyst(s), whether in the complexed form or free, contained in the polymerization media. Thereafter, conventional isolation procedures may be used to obtain a solid polymer substantially free of complexed catalyst or catalyst residue. Polymers processed in this way display a markedly superior heat stability in the melt. This treatment moreover affords substantial economies by enabling one to obtain excellent quality polymers from starting materials of lower purity then would otherwise be suitable.

DETAILED DESCRIPTION OF THE INVENTION

As above indicated, this invention is directed to the work-up of Friedel-Crafts polymerization reaction mixtures. In particular, it is directed to the condensation polymerization of an aromatic or aliphatic (including phosgene) diacyl halide or disulfonyl halide and a compound containing at least two aromatically bound displaceable hydrogens or the self condensation polymerization of a compound containing an acyl or sulfonyl halide group and at least one aromatically bound displaceable hydrogen.

Suitable examples of such reactions include the following:

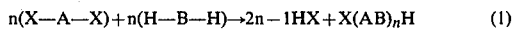

wherein A is

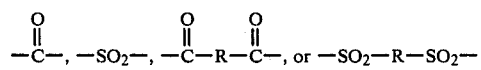

and wherein X is halogen, preferably Cl or F, hydroxy or alkoxy. and wherein R is alkylene, aryl substituted alkylene, arylene or substituted arylene, or polynuclear aromatic either fused ring or joined by one or more bridging groups such as oxygen, sulfur or a moiety of the structure

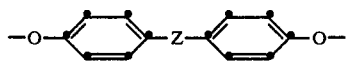

wherein Z is propylidene, CO, SO₂, or a chemical bond and wherein B is arylene or substructured arylene, or polynuclear aromatic either fused ring or joined by one or more bridging groups such as CO, oxygen, sulfur or a moiety of the structure

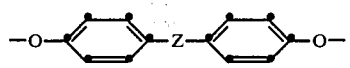

wherein Z is as defined above, and wherein n is the degree of polymerization ordinarily at least about 5.

$$n(XDH) \rightarrow_{n-1} HX + X(D)_n H \qquad (2)$$

wherein X is as defined above and wherein D is CO—B— or —SO₂—B— wherein B and n are as defined above.

As polymers with whose production the present invention is especially concerned, there may first be mentioned poly(aromatic ketones) comprised in whole or part of repeating units of the structure

I i.e., poly(benzophenone ether). As especially preferred, there may be mentioned homopolymers and copolymers having such repeating units and displaying a mean inherent viscosity within the range of about 0.8 to about 1.65, all as disclosed in my U.S. Pat. Nos. 3,953,400 and 3,914,298. Secondly, there may be mentioned polyether ketones characterized by the repeating unit

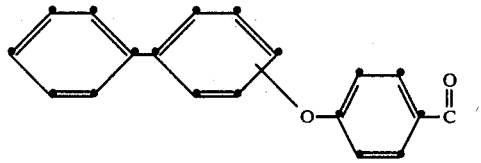

and especially homopolymers of p-biphenylyloxybenzoyl monomers and copolymers thereof formed with minor proportions of corresponding orthocomonomers; polymers having a mean inherent viscosity between about 0.5 and about 1.7 being particularly preferred. Such polymers and the manner of their obtainment are fully described in my U.S. Pat. No. 3,953,400.

Other polymers with whose preparation the present invention is concerned include those described in U.S. Pat. Nos. 3,441,538 and 3,442,857 hereinabove mentioned, U.S. Pat. No. 3,321,449 to Vogel and British Pat. Nos. 971,227 to Goodman et al. and 1,016,245 to Jones.

Any Friedel-Crafts catalyst that will form a soluble complex with the polymer product under the polymerization conditions can be employed in effecting polymerization, including aluminum chloride, boron trifluoride and hydrogen fluoride. Boron trifluoride in hydrogen fluoride is particularly preferred. The amount of such catalyst should be at least one molar equivalent per carbonyl or sulfonyl group in the monomeric reactants.

In the case of the polymers described above and prepared by Friedel-Crafts catalysis, it is generally recognized that the strong tendency to complex formation between the catalyst and the ketone or sulfone groups of the polymer makes the initial polymerization reaction product quite intractable. Specifically, such a complex is soluble in the reaction mixture and attempts to separate this complex into the respective components and then isolate the polymer occasions great difficulty. Although the solvent is removeable as by stripping, this still leaves an intractable complex. Attempts at dilution of the reaction mixture such as with SO₂ do not fully separate the polymer from catalyst residues. It is the presence of unremoved catalyst residues even if partially solvolysed, in the polymer which results in degradation of the polymer on further processing.

The instant invention involves the discovery of an unexpectedly facile method for decomposing the polymer-catalyst complex to afford a non complexed solution of polymer from which solution the pure polymer is then readily isolatable.

Particularly useful solvents used in the polymerizations with which the present invention is concerned include nitrobenzene, o-dichlorobenzene, sym-tetrachloroethane, methylene chloride and mixtures thereof and hydrogen fluoride. The amount of solvent which should be present is at least that sufficient to fully dissolve the monomer or comonomers at the start of reaction and preferably also the uncomplexed polymer resulting from treatment of the reaction mixture according to the instant invention. Sufficient solvent should preferably be present to dissolve the polymer-catalyst complex which is present in the reaction mixture before said treatment. Preferably, the reaction will be carried out under conditions such that all the reactants including catalyst and the reaction end products, i.e., polymer-catalyst complex, and uncomplexed catalyst and uncomplexed polymer are at all times in solution.

In carrying out a polymerization according to the present invention, monomer (XDH) or the appropriate comonomers (X—A—X)+(H—B—H), preferably in approximately equimolar amounts, plus Friedel-Crafts catalyst are added to the reaction solvent. Depending on the reactants and catalyst heating may or may not be necessary to effect reaction. With particularly reactive systems, cooling prior to catalyst addition may be appropriate. As above indicated, when polymerization is complete, one has a mixture comprising polymer-catalyst complex, any excess catalyst and reaction solvent. As above indicated, it is essential that the polymer-catalyst complex be soluble in the reaction medium. If the complex is soluble and any excess catalyst is not, the latter may advantageously be removed by filtration. In any event, treatment of the reaction mixture containing polymer-complex dissolved or suspended by agitation as the case may be, is carried out as hereinafter described.

I have unexpextedly found that the addition to the reaction mixture containing polymer-catalyst complex of materials more basic than the carbonyl group, results in an almost complete elimination of the "intractable" behavior of the complex. It would have been expected that the addition of reactive bases to the reaction media would result in the formation of gelatinous masses containing catalyst residues and further that such addition would lead to highly exothermic reactions. I have found that neither of these expected occurrences in fact transpires. The amount of base added should, of course, be at least that required to react with all the catalyst present, including any uncomplexed and/or excess catalyst i.e., at least an equimolar amount. The upper limit is, of course, set by the effect of the added base upon the solubility of the polymer in the reaction media, but in most instances even a several fold molar excess of base over catalyst will not cause polymer precipitation. In practice the base is added portionwise either neat or dissolved in additional reaction solvent, preferably with vigorous agitation. Ordinarily, both the added base and the reaction mixture will be at or just below ambient temperature. Where a strong base and strongly acidic Friedel-Crafts catalyst are reacting, cooling of the reaction mixture during addition is desireable.

It will be realized that to enable reaction with the catalyst in the complex a base must be chosen which has some solubility in the reaction media and in a preferred embodiment of this invention, the added base is fully miscible in the reaction media. In effect, the added base displaces the polymer as a complexing agent for the acidic catalyst.

Preferably, the base is volatile and/or water soluble to facilitate removal of all traces thereof from the polymer following isolation of the latter. Suitable bases, in addition to having the above-indicated solubility characteristics must fulfill other requirements:

(1) The base must be stable in the reaction medium and not undergo reactions such as disproportionation or formation of cations or other reactive intermediates which can interact with the polymer chain such as by alkylation of the polymer.
(2) The base must have a $pK_a$ of at least about 4.5 measured in water.
(3) The base must not form a stable adduct with the carbonyl or sulfonyl moieties of the polymer.

Preferred bases for use in the practice of this invention include the alkali and alkaline earth halides, aliphatic or aromatic tertiary amines either as the free base or as salts, methanol or ethanol aliphatic or aromatic amides, having no free hydrogens on the amide nitrogen, water or homogeneous mixtures of any of the foregoing.

Particularly preferred bases include methanol, ethanol, water, potassium chloride or fluoride, lithium chloride, acetamide, trimethyl amine, dimethyl formamide, and magnesium and beryllium halides and acetic acid.

One additional unexpected benefit of the addition of the above materials is the remarkably simple isolation techniques which may thereafter be used to effect the separation of the solid polymer from the reaction mixture. After the decomposition of the catalyst-polymer complex with the concomitant formation of the base-catalyst complex, several alternative methods of polymer work-up are available. If the base-catalyst complex is insoluble in the treated reaction mixture, it may be removed by filtration, centrifugation, decantation, or the like and the polymer then recovered from the supernatant solution by known methods. Thus, simple solvent evaporation may be used as in spray drying or film casting and the polymer products obtained thereby exhibit outstanding high temperature stability in comparison with products obtained by prior art techniques, even after extensive washing procedures.

Where the basecatalyst complex is soluble in the reaction solvent, alternative work-up procedures are available.

1. The reaction mixtures may be admixed with a non-solvent for the polymer which is not a non-solvent for the base-catalyst complex. This will cause the polymer to precipitate essentially uncontamined by base and/or catalyst. In some instances further washing of the polymer may be appropriate to remove all traces of reaction solvent and/or catalyst and/or base. However, only the catalyst ever becomes tightly bound to the polymer and since such catalyst is now complexed with base, no difficulty is experienced in removing any base-catalyst complex traces which might be present.

2. Alternatively, where the polymer is not separated from the base-catalyst complex by selective precipitation as above, a mixture of polymer and base-catalyst complex can be treated to obtain pure polymer.

Suitable techniques include pouring or spraying the decomplexed polymer solution containing base-catalyst complex, into a non-solvent for the polymer, but which is miscible with the reaction solvent.

In either case, the decomplexed polymer solution is preferably sprayed, poured, or injected into a mixture of the reaction solvent and non-solvent. Any temperature range suited to the solvents involved may be used in such isolation procedures.

Alternatively, the reaction solvent is evaporated from the treated reaction mixture to afford polymer plus base-catalyst complex. If the base-catalyst complex is volatile, it can be removed by further heating. Since the catalyst is essentially inactive under these conditions, it will not adversely affect the non-volatile polymer residue. If an attempt was made to separate volatile catalyst complexed with polymer by heating, serious degradation of the polymer would result. If the base-catalyst complex is non-volatile, it may be readily removed from the polymer by washing with a suitable inert solvent. The base catalyst complex has no significant tendency to adhere to the polymer and is therefore readily washed out. The only requirement for the inert solvent is that it be a non-solvent for the polymer and a solvent for the base-catalyst complex. Preferred solvents include water and methanol and mixtures thereof.

In some instances the base-catalyst complex is of sufficient stability that it need not be removed from the polymer and will not degrade the latter's performance.

The polymers produced by the process of this invention are, in general, characterized by light color and excellent, even remarkable, thermal stability compared with the same material produced by all known prior art processes.

A most unexpected benefit of the instant invention is that it enables one to use as starting material, monomers of far lower degrees of purity and, therefore, far less expensive than are required by prior art recovery processes and still obtain polymer of acceptable purity and stability.

Though I do not wish to be limited to any particular mechanistic interpretation, I believe that the unexpected benefits of the instant invention result from the decomposition of the polymer-catalyst complex such a manner that gelatinous or intractable precipitates are not formed which are entrained by the polymer and render its obtention in a clean condition difficult or impossible as was the case when worked up according to the prior art. Thus, I have found that by selection of a suitable base, the formation of gelatinous products can be completely avoided and catalyst residue precipitates, where formed, can be readily separated from the polymer without contaminating the latter.

Moreover, I have found that at least some of the impurities commonly present in monomeric starting materials are aldehydes or other compounds with activated carbon atoms. Such activated carbon compounds are believed to complex quite strongly with Friedel-Crafts catalysts, and I believe that when using prior art isolation procedures, some of these complexes survive to contaminate the recovered polymer and markedly degrade its appearance, color, and high temperature properties. When the process of the instant invention is used, I have found that clean, substantially uncontaminated, solid polymers may be obtained by simple isolation procedures, even with monomeric starting materials of very low purity.

The invention will become more apparent from the following more specific examples.

EXAMPLE 1

Into a six hundred ml Teflon PTFE bottle, equipped with a PTFE gas inlet, magnetic stirrer and a PTFE coil condenser cooled with a dry ice-acetone bath was placed 118.2 g (0.51 moles) of p-phenoxybenzoyl chloride and 0.472 g (0.003 moles; 0.60 mole percent) of biphenyl. Four hundred ml of anhydrous hydrogen fluoride was condensed into the reactor at $-78°$ C. The reaction mixture was gently warmed to room temperature to expel hydrogen chloride, then cooled to $-78°$ C., and 53.2 g (0.79 moles) of boron trifluoride was slowly added under slight pressure. After addition was complete, the reaction mixture was allowed to come to room temperature and allowed to stand for 20 hours under a positive pressure of boron trifluoride. The polymer solution was cooled to $-78°$ C., transferred to a six litre PTFE bottle and diluted with sulfur dioxide to a solids content of about 4 percent and spray dried as described in U.S. Pat. No. 3,751,398. The resultant polymer powder was washed repeatedly with large amounts of methanol, then with water, followed by drying in vacuum at 150° to 160° C. to give 90 g of very light pink polymer of inherent viscosity 1.3 (0.1 g/100 ml conc. $H_2SO_4$, 25° C.). This example shows the quality obtained using the best prior art technique. Films pressed from this polymer were slightly yellow and flexible.

EXAMPLE 2

The polymerization of Example I was repeated except that various amounts of water were added as 25% solutions in hydrogen fluoride or as an equimolar adduct with boron fluoride after the polymerization was complete and the polymer was isolated by casting films from the reaction mixture diluted to 5% solids with anhydrous hydrogen fluoride, air drying at room temperature, and then drying for one hour in an oven heated to 200° C. After drying, the films were examined for appearance and color and their inherent viscosity measured. The results are given in Table I. The results indicate that using the technique of the present invention, product of quality equal to or superior to that heretofore obtained can be prepared using a vastly cheaper and more convenient work-up technique.

TABLE I

| Amount of Water % $H_2O$[1] | $H_2O$/HF Added After Polymerization | | $H_2O \cdot BF_3$ Added After Polymerization | |
|---|---|---|---|---|
| | $n_{inh}$ | Appearance | $n_{inh}$ | Appearance |
| 0 | 0.7 | pink, brittle | 0.7 | pink, brittle |
| 3 | 1.2 | white, flexible | 1.3 | white, flexible |
| 6 | 1.2 | white, flexible | 1.3 | white, flexible |
| 9 | 1.3 | white, flexible | — | — |

[1]Based on hydrogen fluoride present.
[2]Control $n_{inh}$ by work-up of Example 1 = 1.3

EXAMPLE 3

The procedure of Example I was followed except that after polymerization excess boron trifluoride was vented from the reaction mixture and water (5% by weight of the hydrogen fluoride present) was added as a 25% solution in hydrogen fluoride. The polymerization media was then transferred to a larger vessel, diluted to 5% solids with anhydrous hydrogen fluoride, and spray dried as in Example 1.

The white polymer powder was dried at 150°–160° C. in air without any other treatment. A clean white polymer of inherent viscosity 1.3 was obtained.

EXAMPLE 4

The procedure of Example 3 was followed except that after addition of the aqueous hydrogen fluoride, the resultant solution was poured into vigorously stirred ice water. The granular precipitate thereby produced was washed with copious quantities of water and dried in an air oven at 150°–160° C. A clean white polymer of inherent viscosity 1.31 was obtained, which had a very low catalyst residue level of less than 10 ppm of boron and less than 50 ppm of fluorine. This resin was extruded onto tin-coated 20 AWC copper conductor in the manner described in essentially U.S. Application Ser. No. 218,461, referred to above, to give a coherent, essentially colorless wire insulation. The ultimate elongation of this insulation ranged between 125 and 150%. The insulated wire was exposed to 340° C. in air and the time which elapsed before the elongation fell to 50% was determined. Values ranging between 45 and 55 hours were obtained.

EXAMPLE 5

The procedure of Example 4 was repeated, except no base (i.e., water) was added during the dilution of the reaction mixture with HF. The resultant polymer was slightly pink after washing and drying and had an inherent viscosity of 1.30; the boron content was approximately 250 ppm and the fluorine content 400 ppm. An insulated wire obtained in the same manner as in Example 4 was yellow-brown and had an elongation of 125 to 150%. When heated in air at 340°, the elongation fell to 50% after about 20 hours.

EXAMPLE 6

To vented polymer solutions in hydrogen fluoride prepared by the method of Example 1 were added respectively methanol, potassium fluoride, ammonium fluoride and magnesium fluoride in amounts at least equimolar to the boron fluoride catalyst contained therein, stirring where necessary until the added solid materials had dissolved. The resultant mixtures were each worked up according to the procedure of Example 4 to yield polymer samples of equivalent quality to that obtained in Example 4.

EXAMPLE 7

Half of a polymer solution made up by the procedure of Example 1 was diluted to 5% solids with anhydrous fluoride (solution A). The other portion of the solution was diluted to 5% solids with hydrogen fluoride containing 5% water by weight (solution B). Both solutions were worked up by the procedure of Example 4. Portions of the polymers obtained were fluxed in a Brabender Plastograph at 400° C., the mixing screws being set at 100 r.p.m. Both polymer samples gave approximately equivalent starting torques (about 1400 meter g) but whilst the polymer from solution A increased in melt viscosity very rapidly and non-linearly at an average rate of about 300 meter g. per min over a period of 20 minutes the instantaneous rate, however, increasing with time, that from solution B increased viscosity uniformly at a rate of 70 meter g per minute over the same period. Slabs were hydraulically pressed from each polymer sample and aged in an oven at 340° C. The time required for the elongation (measured at room temperature) of the sample from solution A to fall to 50% (by interpolation) was about 20 hours, whereas the sample from solution B lasted over twice as long (about 45 hours).

EXAMPLE 8

The monomer (p-phenoxybenzoylchloride) used in all the examples thus far was prepared from p-chlorotoluene and phenol by the same procedure as that described in my U.S. Pat. No. 3,953,400, and was of 99.9% purity as measured by gas chromatographic analysis. The isolation of monomer of this purity requires careful fractional distillation of the acid chloride, an 85% cut of the distillate being made. However, the yield in the distillation is lower than this as the acid chloride tends to polymerize spontaneously in the distilling vessel. A flash distillation yields monomer of about better than 99% purity measured as above and better than 95% yield because of the reduced residence time in the distillation vessel. The impurities tend to reduce molecular weight but this can be compensated for by reducing the amount of capping agent (for example biphenyl). However, the said impurities render the resultant polymer extremely susceptible to high temperature degradation. Thus, parallel polymerizations were run as in Example 1, using the very pure monomer (99.9%) and the monomer obtained by flash distillation. The products were worked up by spray drying as in Example 1, and by precipitation into water followed by washing as in Example 6. In one experiment with each monomer sample, water was added as in Example 6 before precipitation. The results of measurements in a Brabender Plastograph are given in Table II.

TABLE II

| Purity of Monomer | Water Added Before Workup | Workup Technique | Average Rate of Change of Torque |
|---|---|---|---|
| 99.9 | No | Spray Drying | 80 |
| ~99.5 | No | Spray Drying | 250 |
| 99.9 | No | Precipitation into water | 300 |
| ~99.5 | No | Precipitation into water | 500 |
| 99.9 | Yes | Precipitation into water | 65 |
| ~99.5 | Yes | Precipitation into water | 60 |

What is claimed:

1. In a Friedel-Crafts catalyzed polymerization reaction for the preparation of a crystalline polymer, said reaction being selected from the group consisting of $$n(X-A-X) + n(H-B-H) \rightarrow 2n-1 HX + X(AB)_nH$$

wherein A is

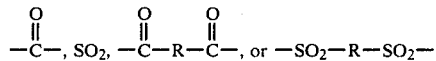

and wherein X is halogen, hydroxy, or alkoxy; and wherein R is alkylene, aryl substituted alkylene, arylene or substituted arylene, or polynuclear aromatic either fused ring or joined by one or more bridging groups such as oxygen, sulfur or a moiety of the structure

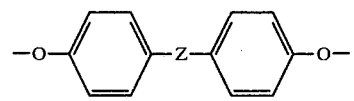

wherein Z is propylidene, CO, SO$_2$, or a chemical bond and wherein B is arylene or substructured arylene, or a polynuclear aromatic, either fused ring or joined by one or more bridging groups such as CO, oxygen, sulfur or a moiety of the structure

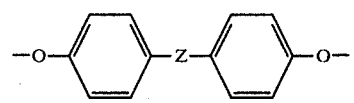

wherein Z is as defined above, and wherein n is the degree of polymerization and is at least about 5 and $$n(XDH) \rightarrow_{n-1} HX + X(D)_nH$$

wherein X is as defined above and wherein D is CO—B— or —SO$_2$B— wherein B is as defined above, wherein at least one molar equivalent of said Friedel-Crafts catalyst is present per carbonyl or sulfonyl group in the monomeric reactants, wherein said polymerization results in the formation of a complex between said Friedel-Crafts catalyst and polymer produced by said reaction, said complex being soluble in the polymerization medium, and wherein said polymerization reaction is carried out in a solvent, said solvent being present in an amount at least sufficient to dissolve the monomeric species present at the start of said polymerization, the improvement comprising treating said reaction mixture comprising polymer-catalyst complex and solvent with a base having a pK$_a$ of at least about 4.5 as measured in water in an amount at least equimolar to the catalyst present, but less than an amount which will precipitate the polymer, said base being at least partially soluble in said reaction solvent, being stable in said polymerization reaction medium and not forming a stable adduct with said polymer products to thereby decompose said polymer-catalyst complex and form a base-catalyst complex, admixing the base treated reaction mixture with a material which is a non-solvent for the polymer and the base-catalyst complex but which is mixable with the reaction solvent to thereby precipitate the polymer and base-catalyst complex, removing the reaction solvent from the base treated reaction mixture, and separating the precipitated polymer from the precipitated base-catalyst complex.

2. The process of claim 1, wherein said polymer comprises recurring units of the structure

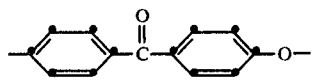

3. The process of claim 1 wherein said polymer comprises recurring units of the structure

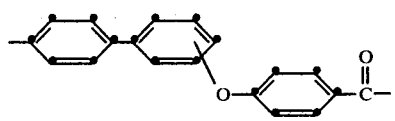

4. The process of claim 1, wherein said Friedel-Crafts catalyst is aluminum chloride, boron trifluoride, hydrogen fluoride, or mixtures thereof.

5. The process of claim 4, wherein said catalyst is a mixture of boron trifluoride and hydrogen fluoride.

6. The process of claim 1, wherein said solvent is nitrobenzene, orthodichlorobenzene, sym-tetrachloroethane, methylene dichloride, mixtures thereof or HF.

7. The process of claim 6, wherein said solvent is HF.

8. The process of claim 1, wherein said base is an alkali or alkaline earth halide, an aliphatic or aromatic tertiary amine, or salt thereof, methanol, ethanol, an aliphatic or aromatic amide having no free hydrogens on the amide nitrogen, acetic acid, water, or a homogeneous mixture thereof.

9. The process of claim 8, wherein said base is methanol, ethanol, water, potassium chloride, potassium fluoride, lithium chloride, acetamide, trimethylamine, dimethylformamide, a magnesium halide or beryllium halide.

10. The process of claim 9, wherein said base is water.

11. The process of claim 1, wherein said base is added dissolved in reaction solvent.

12. In the production of crystalline aromatic polyketones and poly (ketone sulphone)s by a Friedel-Crafts catalysed polymerization reaction wherein at least one molar equivalent of said Friedel-Crafts catalyst is present per carbonyl or sulfonyl group in the monomeric reactants, wherein said polymerization results in the formation of a complex between said Friedel-Crafts catalyst and polymer produced by said reaction, said complex being soluble in the polymerization medium, and wherein said polymerization reaction is carried out in a solvent, said solvent being present in an amount at least sufficient to dissolve the monomeric species present at the start of said polymerization, the improvement comprising treating said reaction mixture comprising polymer-catalyst complex and solvent with a base having a $pK_a$ of at least about 4.5 as measured in water in an amount at least equimolar to the catalyst present, but less than the amount needed to precipitate the polymer, said base being at least partially soluble in said reaction solvent, being stable in said polymerization reaction medium and not forming a stable adduct with said polymer products to thereby decompose said polymer-catalyst complex and form a base-catalyst complex, admixing the base treated reaction mixture with a material which is a non-solvent for the polymer and the base-catalyst complex but which is mixable with the reaction solvent to thereby precipitate the polymer and base-catalyst complex, removing the reaction solvent from the base treated reaction mixture, and separating the precipitated polymer from the precipitated base-catalyst complex.

* * * * *